(12) United States Patent  
Kaneko et al.

(10) Patent No.: US 8,718,120 B2  
(45) Date of Patent: May 6, 2014

(54) TRANSCEIVER

(75) Inventors: Naoji Kaneko, Toyokawa (JP);  
Tomohisa Kishigami, Obu (JP); Hideki Kashima, Kariya (JP)

(73) Assignee: Denso Corporation, Kariya (JP)

(*) Notice: Subject to any disclaimer, the term of this patent is extended or adjusted under 35 U.S.C. 154(b) by 133 days.

(21) Appl. No.: 13/564,986

(22) Filed: Aug. 2, 2012

(65) Prior Publication Data

US 2013/0034132 A1 Feb. 7, 2013

(30) Foreign Application Priority Data

Aug. 3, 2011 (JP) ................................. 2011-170418

(51) Int. Cl.  
*H04B 1/38* (2006.01)

(52) U.S. Cl.  
USPC .......................................................... 375/219

(58) Field of Classification Search  
USPC .................... 375/295, 219, 340, 239, 242  
See application file for complete search history.

(56) References Cited

U.S. PATENT DOCUMENTS

| | | | |
|---|---|---|---|
| 8,406,316 B2 * | 3/2013 | Sugita et al. .................. | 375/259 |
| 2006/0146970 A1 | 7/2006 | Kato et al. | |
| 2007/0183786 A1 | 8/2007 | Hinosugi et al. | |

FOREIGN PATENT DOCUMENTS

| | | |
|---|---|---|
| JP | 2004-266335 | 9/2004 |
| JP | 2007-214731 | 8/2007 |

OTHER PUBLICATIONS

M. Sato, "In-Vehicle Network System Detailed Explanation", Dec. 1, 2005, pp. 70-77 w/partial English translation).

* cited by examiner

*Primary Examiner* — Kevin Kim  
(74) *Attorney, Agent, or Firm* — Harness, Dickey & Pierce, PLC

(57) ABSTRACT

An encoding circuit encodes a NRZ code into a transmission line code. A decoding circuit decodes the transmission line code into a NRZ code. If an operation-mode specified by a setting signal is a normal-mode, a transmission switching circuit provides transmit-data received from an input terminal to the encoding circuit to output the encoded transmit-data as communication-data from a communication terminal. If the operation-mode is a sleep-mode, the transmission switching circuit outputs the transmit-data received from the input terminal as the communication-data from the communication terminal. If the operation-mode specified by the setting signal is a normal-mode, a reception switching circuit provides the communication-data received from the communication terminal to the decoding circuit to output the decoded communication-data as receive-data from an output terminal. If the operation-mode is a sleep-mode, the reception switching circuit outputs the communication-data received from the communication terminal as the receive-data from the output terminal.

2 Claims, 8 Drawing Sheets

TRANSCEIVER

CROSS-REFERENCE TO RELATED APPLICATION

This application is based on and claims the benefit of priority from earlier Japanese Patent Application No. 2011-170418 filed Aug. 3, 2011, the description of which is incorporated herein by reference.

BACKGROUND

1. Technical Field

The present invention relates to a transceiver applied to a node having a sleep/wakeup function.

2. Related Art

Conventionally, a communication system is known which is installed in a vehicle and uses a bus communication line, such as CAN (Controller Area Network) and LIN (Local Interconnect Network) (refer to, e.g., "In-vehicle Network System Detailed Explanation" written by Michio Sato, CQ Publishing Co., Ltd, issued Dec. 1, 2005).

To perform efficient communication in this type of communication system, operations of transceivers provided in nodes for transmitting and receiving signals via a bus communication line are desired to be synchronized with each other.

In this case, any one of the nodes transmits a signal encoded with a transmission line code including a clock component to the bus communication line. The other nodes extract the clock component from the signal on the bus communication line, and process (e.g. divide) a free-running clock generated by the own transceiver. Thereby, the other nodes generate a bus clock synchronized with the extracted clock component to operate the transceiver according to the bus clock.

In addition, including the following function is considered. According to this function, in order to reduce the power consumption by the nodes configuring the communication system, if a predetermined sleep condition is met, the node shifts to a sleep mode which is an operation mode for stopping part of functions of the node. If a wakeup condition is met, or the output of a predetermined start signal to a communication line is detected, the node in the sleep mode shifts to a wakeup mode which is an operation made for operating all the functions of the node.

Meanwhile, if the node in the sleep mode is activated by using a start signal, the transceiver is required to be operated all the time regardless of the operation mode so that the start signal can be received all the time.

However, if the transceiver is operated continuously, a bus clock required for the operation of the transceiver and various timing signals synchronized with the bus dock are generated. Hence, even in the sleep mode, significant electric power is consumed.

SUMMARY

An embodiment provides a transceiver which can transmit and receive a start signal without increasing the power consumption by a node in a sleep mode.

As an aspect of the embodiment, a transceiver is provided which includes: an input terminal which receives transmit data represented by a NRZ code; an output terminal which outputs receive data represented by a NRZ code; a communication terminal which receives and outputs communication data transmitted via a communication line; a mode setting terminal which receives a mode setting signal specifying a normal mode or a sleep mode, the normal mode being an operation mode in which a NRZ code is encoded into a predetermined transmission line code and the transmission line code is decoded into a NRZ code, and the sleep mode being an operation mode in which a function for encoding and decoding is stopped to establish a low power consumption state; an encoding circuit which encodes a NRZ code into the transmission line code; a decoding circuit which decodes the transmission line code into a NRZ code; a transmission switching circuit which, if the operation mode specified by the mode setting signal is a normal mode, provides the transmit data received from the input terminal to the encoding circuit to output the transmit data encoded by the encoding circuit as the communication data from the communication terminal, and which, if the operation mode specified by the mode setting signal is a sleep mode, outputs the transmit data received from the input terminal as the communication data from the communication terminal; and a reception switching circuit which, if the operation mode specified by the mode setting signal is a normal mode, provides the communication data received from the communication terminal to the decoding circuit to output the communication data decoded by the decoding circuit as the receive data from the output terminal, and which, if the operation mode specified by the mode setting signal is a sleep mode, outputs the communication data received from the communication terminal as the receive data from the output terminal.

DETAILED DESCRIPTION OF THE PREFERRED EMBODIMENTS

With reference to the accompanying drawings, hereinafter will be described an embodiment of the present invention.

<General Configuration>

Figure 1:
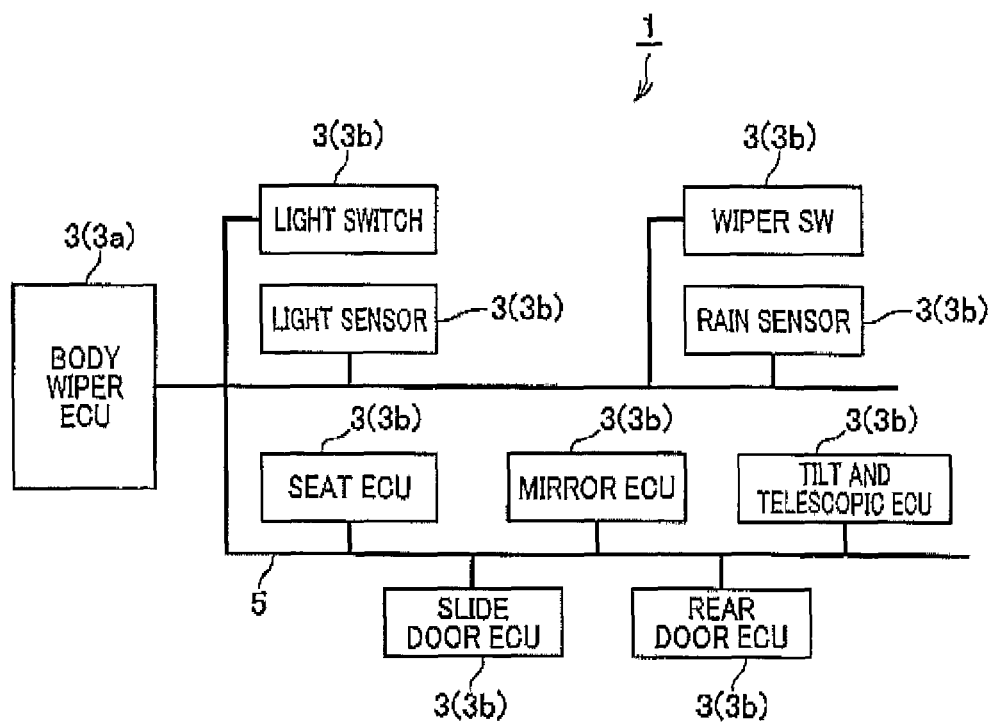
FIG. 1 is a block diagram showing a schematic configuration of an in-vehicle communication system.

FIG. 1 is a block diagram showing a schematic configuration of a communication system 1. In the communication system 1, nodes 3 are interconnected via a communication line 5 having a bus form (hereinafter, referred to as "bus communication line 5"), The nodes 3 include an electronic control unit (body system ECU) realizing is applications for a body system, and associated devices (lights, sensors and the like) provided for detecting a state of a vehicle or controlling the state of the vehicle.

As shown in FIG. 1, in the nodes 3 configuring the communication system 1, the body system ECU includes a body wiper ECU, a seat ECU, a slide door ECU, a mirror ECU, a rear door ECU, a light ECU, a tilt and telescopic (electric steering positioning unit) ECU. The associated device includes a light switch (SW), a wiper SW, a light sensor, and a rain sensor.

<Bus Communication Line>

The bus communication line 5 is configured so that when a high-level signal and a low-level signal are simultaneously outputted from the different nodes 3, the signal level on the bus communication line 5 becomes low level. Bus arbitration is realized by using this function.

Figure 2A:
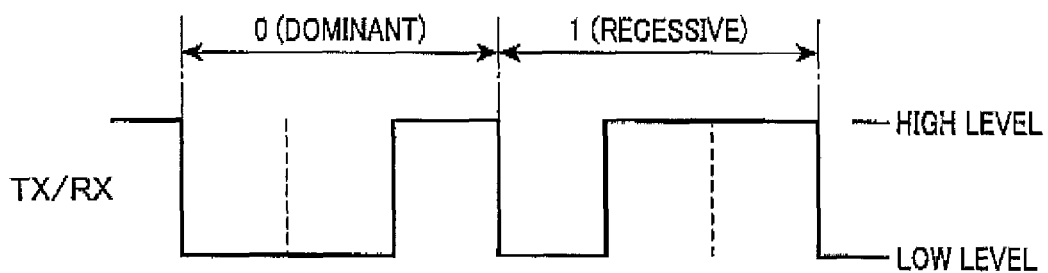
FIG. 2A is a diagram for explaining a structure of a transmission line code used on a bus communication line.

FIG. 2A is a diagram for explaining a transmission line code used on the bus communication line 5.

As shown in FIG. 2A, on the bus communication line 5, a PWM code is used as the transmission line code. In the PWM code, the signal level changes from low level to high level within a bit. Thereby, a binary signal formed of recessive (corresponding to "1" in the present embodiment) and dominant (corresponding to "0" in the present embodiment) is represented by two types of duty ratios.

Specifically, the percentage of dominant low level is higher than that of the recessive level (in the present embodiment, the period of time of recessive is one third of that of one bit, and the period of time of dominant is two thirds of that of one bit). Hence, if recessive and dominant collide with each other on the bus communication line 5, the dominant level wins in arbitration.

In the communication system 1, an access control method, so-called CSMA/CA (Carrier Sense Multiple Access with Collision Avoidance) method is used, by which a node 3 which has lost in arbitration immediately stops transmission, and only a node 3 which has won in arbitration continues transmission.

Figure 2B:
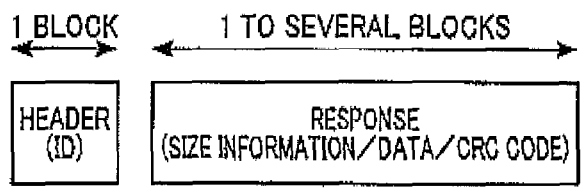
FIG. 2B is a diagram for explaining a structure of a frame transmitted and received via the bus communication line.

FIG. 2B is a diagram for explaining a structure of a frame used for the communication between the nodes 3.

As shown in FIG. 2B, the frame includes a header for specifying data which is allowed to be transmitted, and a variable-length response for transmitting the data specified by the header.

The header includes an identifier (ID) of data which is allowed to be transmitted. As the value of ID is smaller, the data identified by the ID wins and remains longer in bus arbitration. The response includes, in addition to data, size information indicating the size of data (response), and a CRC (cyclic redundancy check) code for checking presence or absence of an error.

<Nodes>

The nodes 3 operate in a wakeup mode and a sleep mode. The wakeup mode is an operation mode which can execute all previously assigned functions. The sleep mode is an operation mode which stops part of the functions (encoding, decoding in the present embodiment) to realize a low power consumption state.

In addition, one of the nodes 3 (body wiper ECU) is used as a master 3a, the others of the nodes 3 are used as slaves 3b. The master 3a transmits the header to sequentially specify the data which is allowed to be transmitted (furthermore, a slave 3b which is to be a source of data). The following polling and event communication are performed. In the polling, the slave 3b, which is to be a source of data specified by the header, transmits the response (data). In the event communication, the slaves 3b autonomously control communication regardless of instructions from the master 3a.

Figure 3:
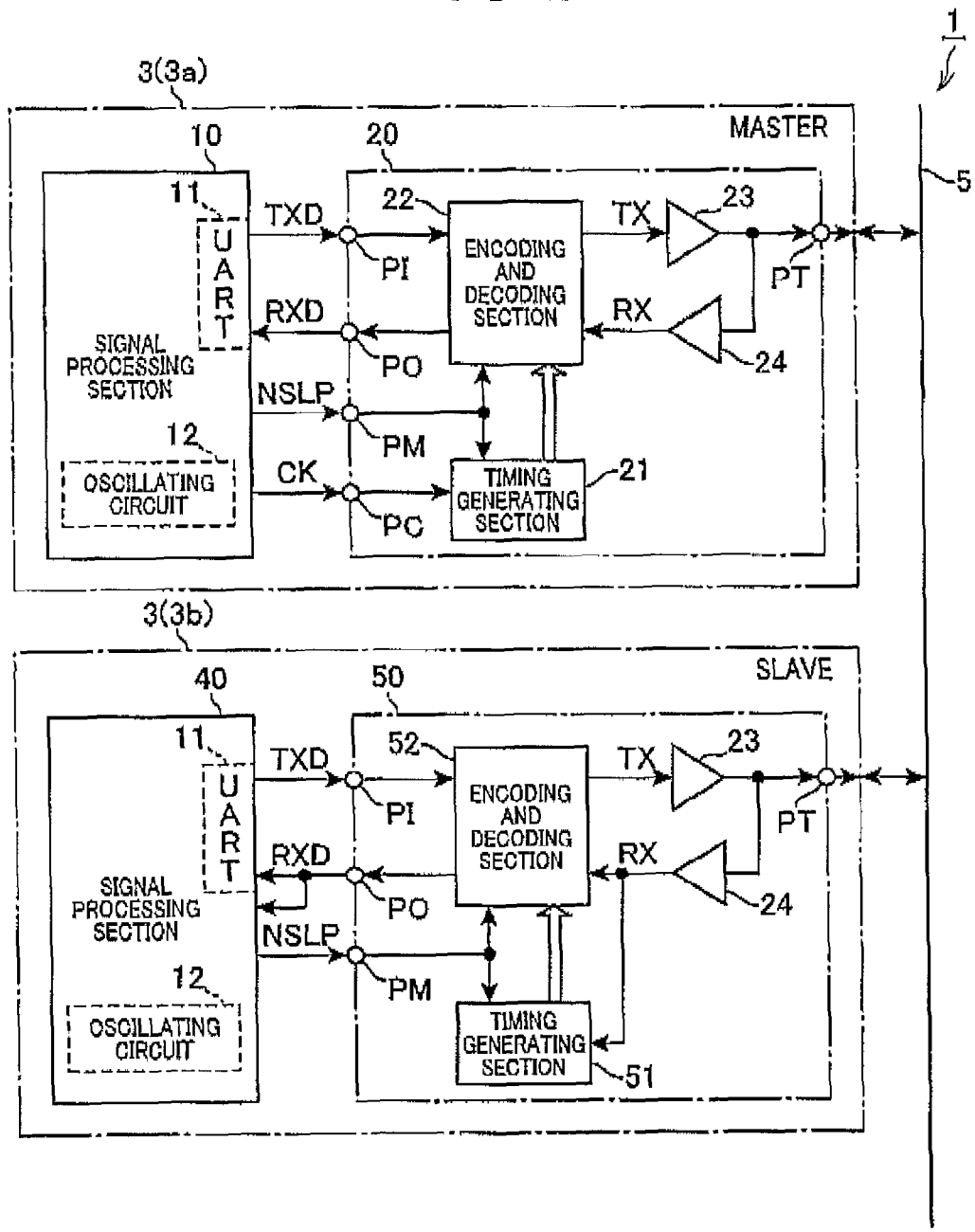
FIG. 3 is a block diagram showing configurations of a master node and a slave node.

Hereinafter, configurations of the master 3a and the slave 3b are described with reference to a block diagram shown in FIG. 3.

<Master>

The master 3a includes a signal processing section 10 and a transceiver 20. The signal processing section 10 performs various processes assigned to the own node 3 on the basis of information obtained by the communication with another node 3 via the bus communication line 5. The transceiver 20 receives transmit data TXD formed of a NRZ (nonreturn to zero) code provided from the signal processing section 10 via an input terminal PT. The transceiver 20 outputs transmit data TX, in which the received transmit data TXD is encoded into a PWM (pulse width modulation) code or not encoded, to the bus communication line 5 via a communication terminal PT. The transceiver 20 provides receive data RXD, in which receive data RX received from the bus communication line 5 via a communication terminal PT is decoded from a PWM code to a NRZ code or not decoded, to the signal processing section 10 via an output terminal PO.

In addition, the transceiver 20 includes, in addition to the input terminal PI, the output terminal PO, and the communication terminal PT, a dock terminal PC for receiving an internal clock CK provided from the signal processing section 10, and a mode setting terminal PM for receiving a mode setting signal NSLP provided from the signal processing section 10.

<Signal Processing Section>

The signal processing section 10 is mainly configured with a known microcomputer including a CPU, a ROM, a RAM, an IO port. In addition, the signal processing section 10 includes a UART (Universal Asynchronous Receiver Transmitter) 11 which realizes asynchronous serial communication, and an oscillating circuit 12 which generates an operation clock for operating the signal processing section 10 and an internal clock CK which is set to the same communication speed as that of the UART 11 (in the present embodiment, 20 Kbps) and is provided to the transceiver 20.

Note that the oscillating circuit 12 is configured with a crystal oscillator which oscillates at a stable frequency. In addition, the signal processing section 10 provides a mode setting signal NSLP to the transceiver 20. The mode setting signal NSLP is on non-active level when the operation mode of the own node is in a wakeup mode, and is on active level when the operation mode is in a sleep mode.

Figure 2C:
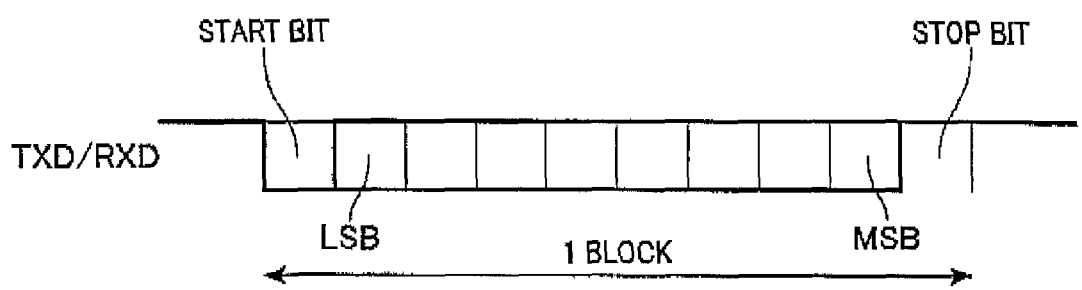
FIG. 2C is a diagram for explaining a structure of block data transmitted and received by UART.

FIG. 2C is a diagram for explaining the structure of data TXD and RXD transmitted and received by the UART 11. As shown in FIG. 2C, the UART 11 performs transmission and reception in units of 10 bits in total of block data including 1 start bit (low level) indicative of the start of the data, 1 stop bit (high level) indicative of the end of the data, and 8 bits of data between the start bit and the stop bit. Note that, in the 8 bits of data which is a main part, the LSB (the least significant bit) is positioned at the beginning and the MSB (the most significant bit) is positioned at the ending.

Note that, the header of the frame (refer to FIG. 2B) is formed of a single block data. In the 8 bits of data excluding the start bit and the stop bit, 7 bits are used as ID, and 1 bit is used as a parity bit. In addition, the response is formed of one or more block data. In the response, the size information is set in the first block.

<Transceiver>

Returning to FIG. 3, the transceiver 20 includes a timing generating section 21, a encoding and decoding section 22, a transmission buffer 23, and a reception buffer 24. The timing generating section 21 generates various timing signals synchronized with the internal clock CK provided from the signal processing section 10 via the clock terminal PC. The encoding and decoding section 22 encodes the transmit data TXD and decodes the receive data RX according to the timing signal generated by the timing generating section 21. The transmission buffer 23 outputs the transmit data TX encoded by the encoding and decoding section 22 via the communication terminal PT. The reception buffer 24 binarizes a signal received via the communication terminal PT, and provides the binarized signal as the receive data RX to the encoding and decoding section 22.

Note that the transmission buffer 23 is configured with, for example, a known open collector circuit so that bus arbitration can be performed on the bus communication line 5. In addition, the reception buffer 24 is configured with a known comparator which outputs high level if the signal level on the bus communication line 5 is higher than a predetermined threshold, and outputs low level if the signal level on the bus communication line 5 is not higher than the predetermined threshold.

The timing generating section 21 includes a simple oscillating circuit configured with, for example, a ring oscillator formed by connecting a plurality of inverters in a ring shape. The timing generating section 21 performs dividing of a count clock CCK generated by the oscillating circuit, thereby generating various timing signals.

<Timing Generating Section>

Figure 4:
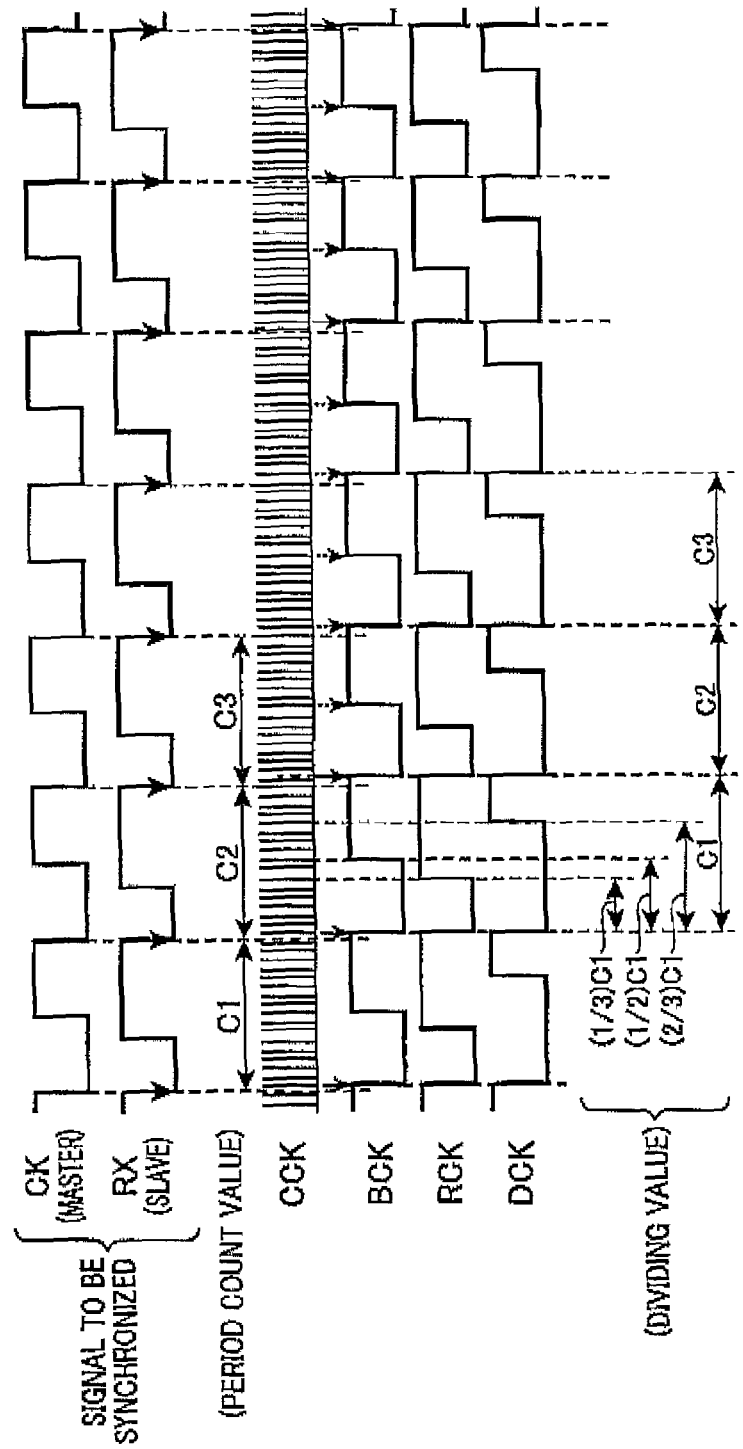
FIG. 4 is a diagram for explaining various timing signals generated by a timing generating section.

FIG. 4 is a diagram for explaining various timing signals generated by the timing generating section 21. Note that the count clock CCK, which is generated by the oscillating circuit, has a sufficiently high frequency compared with the internal clock CK (several tens to several hundreds of times higher).

The timing generating section 21 includes a counter and a dividing circuit. The counter counts the interval between falling edges of the internal clock CK, that is, the length of one period, using the count clock CCK. The dividing circuit performs dividing for the count clock CCK on the basis of a period count value Ci (i=1, 2, . . . ) obtained by the counter, thereby generating various timing signals synchronized with the internal clock CK.

Specifically, clocks described below are generated as the various timing signals.

As shown in FIG. 4, the timing generating section 21 generates a bus clock BCK, a recessive generation clock RCK, and a dominant generation clock DCK. The bus clock BCK has a period corresponding to the period count value Ci, and 50% of duty cycle. In the bus dock BCK, the interval between a falling edge and a rising edge has a length corresponding to ½ of the period count value Ci. The recessive generation clock RCK falls at the falling edge of the bus dock BCK, and rises at the timing until which the period of time corresponding to ⅓ of the period count value has passed from the falling edge. The dominant generation clock DCK falls at the falling edge of the bus clock BCK, and rises at the timing until which the period of time corresponding to ⅔ of the period count value has passed from the falling edge.

Note that the timing generating section 21 follows the operation mode indicated by the mode setting signal NSLP. When the operation mode is the wakeup mode (NSLP=1: non-active level), the timing generating section 21 operates the oscillating circuit to generate the timing signal. When the operation mode is the sleep mode (NSLP=0: active level), the timing generating section 21 stops the oscillating circuit to stop the generation of the timing signal.

<Encoding-decoding Section>

Figure 5:
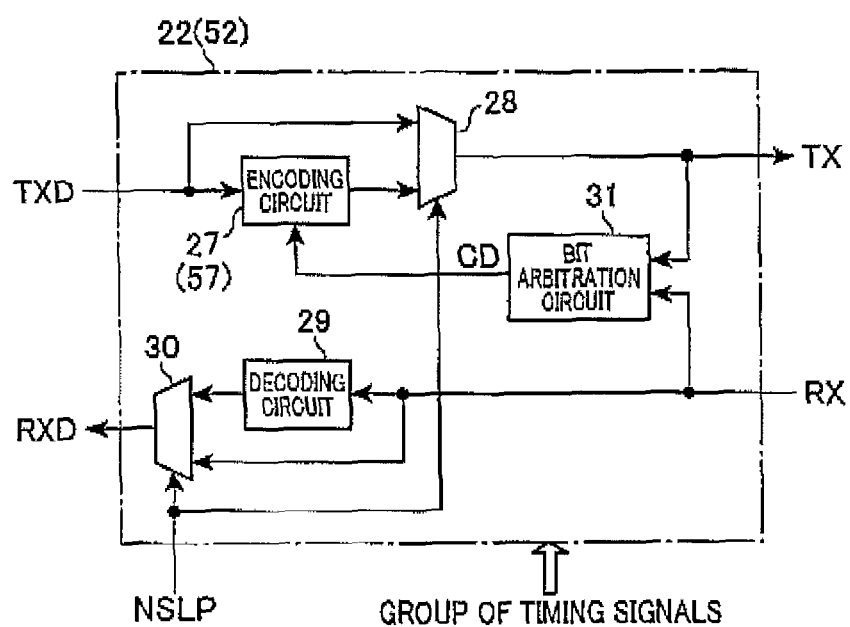
FIG. 5 is a block diagram showing a configuration of a encoding-decoding section.

FIG. 5 is a block diagram showing the configuration of the encoding-decoding section 22.

As shown in FIG. 5, the encoding-decoding section 22 includes an encoding circuit 27 and a transmitting side selector 28. The encoding circuit 27 encodes transmit data TXD (NRZ code) inputted via an input terminal into a transmission line code (PWM code). The transmitting side selector 28 provides an output of the encoding circuit 27 (encoded transmit data TXD) or transmit data TXD, which has bypassed the encoding circuit 27 and is not encoded, to the transmission buffer 23 as transmit data TX, according to the operation mode indicated by the mode setting signal NSLP.

In addition, the encoding-decoding section 22 includes a decoding circuit 29, a receiving side selector 30, and a bit arbitration circuit 31. The decoding circuit 29 decodes the receive data RX received by the reception buffer 24 into a NRZ code, The receiving side selector 30 provides an output of the decoding circuit 29 (decoded receive data RX) or receive data RX, which has bypassed the decoding circuit 29 and is not decoded, to the signal processing section 10 as receive data RXD, according to the operation mode indicated by the mode setting signal NSLP. The bit arbitration circuit 31 compares the transmit data TX with the receive data RX by bit (by code). If the signal levels (recessive/dominant) of the transmit data TX and the receive data RX do not agree with each other, the bit arbitration circuit 31 outputs a collision detection signal CD, which is on active level, to the encoding circuit 27.

If the transmit data TXD is on low level (0), the encoding circuit 27 uses the dominant generation clock DCIS to generate a PWM code (dominant), in which the first ⅔ period of time of 1 bit is low level, and the last ⅓ period of time of 1 bit is high level. If the transmit data TXD is on high level (1), the encoding circuit 27 uses the recessive generation clock RCK to generate a PWM code (recessive), in which the first ⅓ period of time of 1 bit is low level, and the last ⅔ period of time of 1 bit is high level.

Note that when the transmit data TXD is not provided from the signal processing section 10 (not shown), the input of the encoding circuit 27 becomes high level, and recessive is continued to be outputted to the bus communication line 5. Hereinafter, the period of time, during which recessive continues equal to or more than the predetermined acceptable number of bits (in the present embodiment, 11 bits) on the bus communication line 5, is referred to as IFS (Inter Frame Space). The state in which IFS is detected is referred to as an idle state.

In addition, if the collision detection signal CD becomes active, (that is, if the own node 3 loses in arbitration), the encoding circuit 27 forcibly outputs recessive until the process for block data, to which the transmit data TXD during processing belongs, is completed (that is, during the period of time between the timing when the falling edge of the start bit is detected and the timing of the end of the tenth bit which is the stop bit), regardless of the signal level of the transmit data TXD.

Meanwhile, the decoding circuit 29 samples the receive data RX at the timing of the rising edge of the bus clock BCK, and outputs the result of the sampling as the decoded receive data RXD.

When the operation mode indicated by the mode setting signal NSLP is the normal mode, the transmitting side selector 28 and the receiving side selector 30 respectively select the encoded transmit data (output of the encoding circuit 27) and the decoded receive data (output of the decoding circuit 29). When the operation mode is the sleep mode, the transmitting side selector 26 and the receiving side selector 30 respectively select the non-encoded transmit data (transmit data TXD) and the non-decoded receive data (receive data RX).

In addition, the bit arbitration circuit 31 samples the signal levels of the transmit data TX and the receive data RX at the timing of the rising edge of the bus clock BCK (approximately middle of the code), and compares the sampled signal levels with each other by using an exclusive OR circuit (XOR gate). The bit arbitration circuit 31 outputs the output of the XOR gate as collision detection signal CD.

<Operations of Transceiver>

Figure 6:
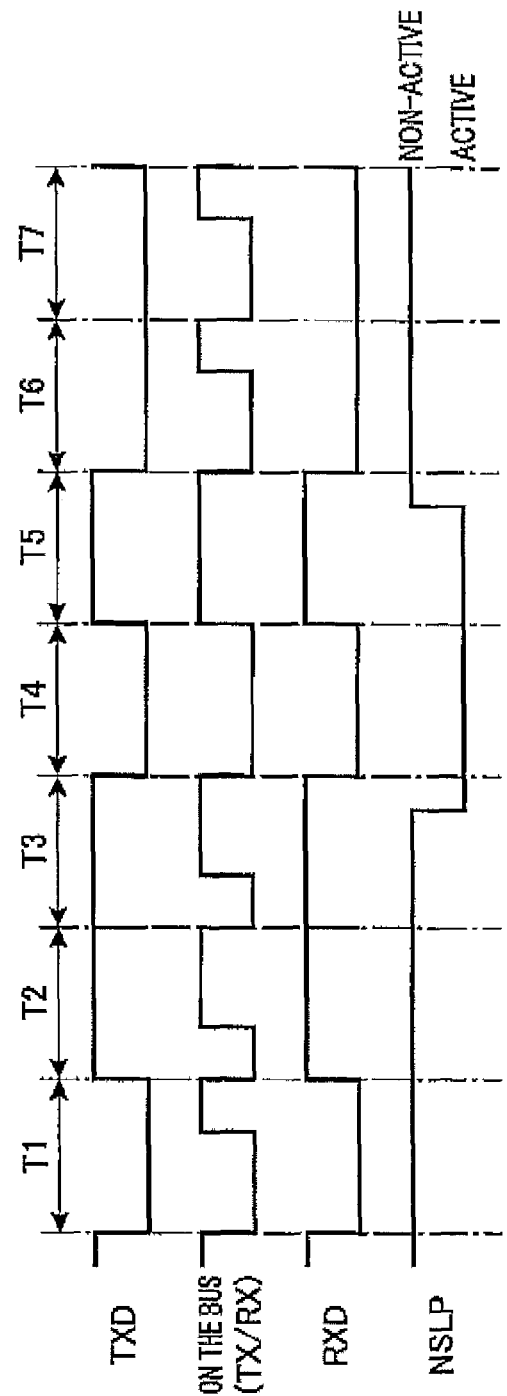
FIG. 6 is a timing diagram showing operations in operation modes.

FIG. 6 is a timing diagram showing operations of the transceiver 20 in operation modes.

As shown in FIG. 6, during the period of time (refer to T1 to T3, T6 and T7) in which the operation mode is the normal mode (NSLP: non-active), the transceiver 20 outputs the transmit data TX, which is obtained by encoding the transmit data TXD into a PWM code, and outputs the receive data RXD, which is obtained by decoding the receive data RX. In addition, the transceiver 20 continues to output recessive to the bus communication line 5, even when the signal processing section 10 has not provided the transmit data TXD (not shown). Thereby, the transceiver 20 operates as a dock master which provides clock components required for regenerating the bus clock BCK to the node 3 other than the master 3a.

Meanwhile, during the period of time (refer to T4, T5) in which the operation mode is the sleep mode (NSLP: active level), the transceiver 20 outputs the transmit data TXD as the transmit data TX. In addition, the transceiver 20 outputs the receive data RX as the receive data RXD. At this time, operations of the timing generating section 21, the encoding circuit 27, and the decoding circuit 29 are stopped.

<Slave>

Returning to FIG. 3, the slave 3b includes a signal processing section 40 and a transceiver 50. As in the case of the master 3a, the signal processing section 40 performs various processes assigned to the own node 3, on the basis of information obtained by the communication with another node 3 via the bus communication line 5. The transceiver 50 receives the transmit data TXD formed of a NRZ code provided from the signal processing section 40 via the input terminal PI, and outputs the transmit data TX, which is obtained by encoding the received transmit data TXD into a PWM code or which is the received transmit data TXD, to the bus communication line 5 via the communication terminal PT. In addition, the transceiver SO provides the receive data RXD, which is obtained by decoding the receive data RX received from the bus communication line 5 via the communication terminal PT from a PWM code to a NRZ code or which is the received receive data RX, to the signal processing section 40 via the output terminal PO.

In addition, the transceiver 50 includes, in addition to, the input terminal PI, the output terminal PO, and the communication terminal PT, a mode setting terminal PM for receiving a mode setting signal NSLP provided from the signal processing section 10.

<Signal Processing Section>

The signal processing section 40 has the same configuration as that of the signal processing section 10 except that the signal processing section 40 does not have the function for providing the internal clock CK to the transceiver 50 but has a clock determining function for determining presence or absence of a clock (output of a PWM code) by receiving the receive data RXD, not via the UART 11.

The clock determining function is used when the operation mode is the sleep mode, and receives receive data RXD outputted from the output terminal PO of the transceiver 50, that is, a signal which has not been decoded and has passed through the bus communication line 5. If the falling edge is detected a predetermined times (e.g. 10 times) or more during a predetermined period of time (e.g. 1ms), the clock determining function determines that a clock has been provided via the bus communication line 5. Note that the presence or absence of a clock may be determined by using a known input capture function included in a microcomputer. If a predetermined PWM waveform (recessive, dominant) is detected, it may be determined that a clock is present.

Note that the signal processing section 40 of the slave 3b is not necessarily required to be configured with a microcomputer. The signal processing section 40 may be configured with a sequencer including a function corresponding to the UART 11 and an oscillating circuit which generates an operation dock for operating the sequencer.

<Transceiver>

The transceiver 50 includes, as in the case of the transceiver 20, a timing generating section 51, a encoding-decoding section 52, the transmission buffer 23, and the reception buffer 24. Parts of the configurations of the timing generating section 51 and the encoding-decoding section 52 differ from those of the timing generating section 21 and the encoding-decoding section 22 of the transceiver 20.

Specifically, the timing generating section 51 differs from the timing generating section 21 in the following configurations. When the timing generating section 51 generates various timing signals, the signal to be synchronized is not the internal clock CK but the receive data RX obtained from the bus communication line 5 via the reception buffer 24. In addition, the recessive generation clock RCK, which is one of the timing signals, Is not generated, but the bus clock BCK and the dominant generation clock DCK are generated.

In addition, the encoding-decoding section 52 has the same configuration as that of the encoding and decoding section 22 except for part of the operation of the encoding circuit 27. Hereinafter, the encoding circuit of the encoding-decoding section 52 is referred to as "encoding circuit 57" so as to be distinguished from the encoding circuit 27 of the encoding and decoding section 22.

When the transmit data TXD is low level (0), the encoding circuit 57 generates a first code by using the bus clock BCK and the dominant generation clock DCK. The first code changes to low level at a timing slightly later than the falling edge of the bus clock BCK, and changes to high level at the timing of the dominant generation dock DCK. When the transmit data TXD is high level (1), the encoding circuit 57 generates a second code which is high level over the whole period of time of one bit.

The first code and the second code are outputted to the bus communication line 5 via the transmission buffer 23. When another node 3 does not transmit data (when recessive is outputted from the master 3a by the function of the clock master), or when the another node 3 transmits recessive, the first code is converted into dominant and the second code is converted into recessive on the bus communication line 5. The dominant and the recessive are transmitted to the another node 3.

In addition, when the another node 3 transmits dominant, both the first code and the second code are converted into dominant on the bus communication line 5. Hence, if the first code is transmitted, winning in arbitration is determined. If the second code is transmitted, losing in arbitration is determined.

As described above, the transceiver 50 of the slave 3b has the same functions as those of the transceiver 20 except that the transceiver 50 does not have the function of a clock master. That is, the transceiver 50 has a function for enabling/disabling encoding and decoding of transmit data and receive data according to the operation mode.

<Processes in the Signal Processing Sections>

Hereinafter, a wakeup process and a sleep process performed by the signal processing sections 10, 40 are described.

Figure 7:
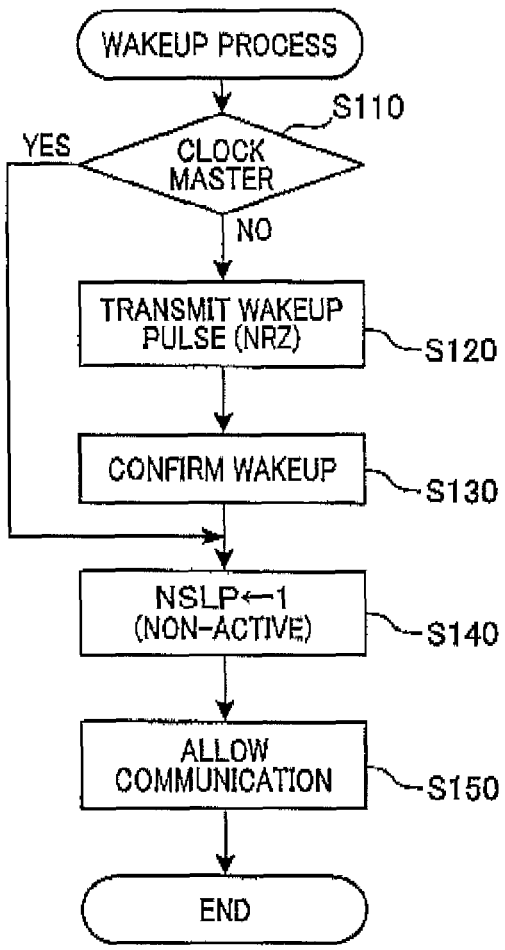
FIG. 7 is a flowchart showing a procedure of a wakeup process performed by a signal processing section.
Figure 8:
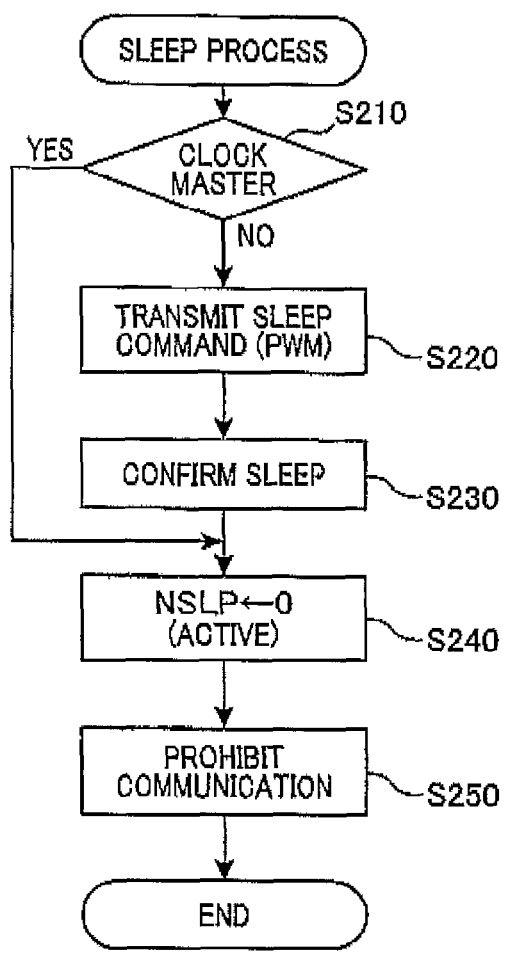
FIG. 8 is a flowchart showing a procedure of a sleep process performed by the signal processing section.

FIG. 7 is a flowchart showing the procedure of the wakeup process. FIG. 8 is a flowchart showing the procedure of the sleep process.

<Wakeup Process>

The wakeup process is activated, when the operation mode is the sleep mode, and predetermined wakeup factors are present. The wakeup factors include various switch operations by the driver of the vehicle, such as input of the light switch. Note that, as for the master 3*a* (clock master), the wakeup factors include the reception of a wakeup pulse.

When the wakeup process is activated, as shown in FIG. 7, in S110, it is determined whether or not the own node is the master 3*a*.

If the own node is the master 3*a*, the process proceeds to S140, in which the mode setting signal NSLP is changed to "1" (non-active), and the output of the internal clock CK to the transceiver 20 starts.

Hence, the transceiver 20 starts generation of various timing signals based on the internal clock CK. As a result, the output of a clock (PWM code) to the bus communication line 5 is started. In addition, encoding of the transmit data and decoding of the receive data can be done.

Next, in S150, applications performed by the signal processing section 10 are allowed to communicate with another node via the bus communication line 5. Then, the process is completed.

Meanwhile, in the S110, if it is determined that the own node is not the master 3*a* but the slave 3*b*, the process proceeds to S120, in which a wakeup pulse (low level purse) is transmitted. The wakeup pulse may transmit arbitrary block data via, for example, the UART 11. That is, since the block data includes a start bit, the start bit becomes a wakeup pulse. In addition, by operating an output port provided in addition to the UART 11, the wakeup pulse may be transmitted without using the UART 11.

The wakeup pulse outputted from the signal processing section 40 of the slave 3*b* as described above is outputted to the bus communication line 5 without being encoded by the transceiver 50. In addition, the wakeup pulse received by the node 3 from the bus communication line 5 is provided to the signal processing sections 10, 40 without being decoded by the transceivers 20, 50.

Note that, in the signal processing section 40 of the slave 3*b*, the reception of the wakeup pulse is ignored. Meanwhile, in the signal processing section 10 of the master 3*a*, the wakeup process is activated by receiving the wakeup pulse. The signal processing section 10 operates as in the case where affirmative judgment is made in the S110. Then, the output of a dock to the bus communication line S is started.

Next, in step S130, by using the clock determining function, the signal processing section waits until the output of the clock to the bus communication line 5 is confirmed. If the output of the clock is confirmed, the processes of the S140 and S150 described above are performed.

Note that, the process in the present step by the signal processing section 40 of the slave 3*b* differs from that by the signal processing section 10 of the master 3*a* in that the internal clock CK is not outputted to the transceiver 50.

Hence, the transceiver 50 of the slave 3*b* can generate various timing signals on the basis of clock components extracted from a signal on the bus communication line 5. In addition, the transceiver 50 can encode the transmit data and decode the receive data according to the timing signal.

<Sleep Process>

Next, the sleep process is activated, when the operation mode is the normal mode, and predetermined sleep prohibition factors are not present. The sleep prohibition factors include, for example, input of the light switch. Note that, in the master 3*a*, the present process is also activated when a sleep command is received.

When the present process is activated, as shown in FIG. 8, in S210, it is determined whether or not the own node is the master 3*a*.

If the own node is the master 3*a*, the process proceeds to S240, in which the mode setting signal NSLP is changed to 0 (active), and the output of the internal clock CK to the transceiver 20 stops.

Hence, the transceiver 20 stops generation of various timing signals based on the internal clock CK. As a result, the output of a clock to the bus communication line 5 is also stopped. In addition, the transmit data and the receive data can be passed without being encoded and decoded.

In S250, applications performed by the signal processing section 10 are prohibited from communicating with another node via the bus communication line 5. Then, the present process is completed.

Meanwhile, in the S210, if it is determined that the own node is not the master 3*a*, the process proceeds to S220, in which a sleep command is transmitted.

The sleep command outputted from the signal processing section 40 of the slave 3*b* is encoded into to a PWM code by the transceiver 50, and then outputted to the bus communication line 5. In addition, the sleep command received by the node 3 from the bus communication line 5 is decoded by the transceivers 20, 50, and then is provided to the signal processing sections 10, 40.

Note that, in the signal processing section 40 of the slave 3*b*, the reception of the sleep command is ignored. Meanwhile, in the signal processing section 10 of the clock master, the sleep process is activated by receiving the sleep command. The signal processing section 10 operates as in the case where affirmative judgment is made in step S210. The output of a clock (recessive code) to the bus communication line 5 is stopped.

Next, in step S230, the signal processing section waits until the stop of the output of the clock to the bus communication line S is confirmed. If the stop of the clock is confirmed, the processes in S240 and S250 described above are performed.

Note that, the process by the signal processing section 40 of the clock slave differs from that by the signal processing section 10 of the dock master in that the output of the internal clock CK to the transceiver 50 is not stopped.

Hence, the transceiver 50 stops the generation of various timing signals based on clock components extracted from a signal on the bus communication line S. In addition, the transceiver 50 also cannot encode the transmit data and decode the receive data according to the timing signal.

<Advantages>

As described above, in the normal mode in which the timing generating sections 21 and 51 operate, the transceivers 20, 50 output the transmit data TX, which is obtained by encoding the transmit data TXD provided from the signal processing sections 10, 40 to a PWM code, to the bus communication line 5, and provide the receive data RXD, which is obtained by decoding the receive data RX received from the bus communication line 5 to a NRZ code, to the signal processing sections 10, 40. In the sleep mode in which the timing generating sections 21 and 51 are stopped, the transceivers 20, 50 output the transmit data TXD provided from the signal processing sections 10, 40 as the transmit data TX to the bus communication line 5, and provides the receive data RX received from the bus communication line 5 as the receive data RXD to the signal processing sections 10, 40.

Hence, for nodes 3 configured with the transceivers 20, 50, a wakeup pulse (start signal), which is used when the transition from the sleep mode to the normal mode is requested by the slave 3b to the master 3a, can be transmitted and received without increasing the power consumption by nodes which are in the sleep mode.

Note that, in the present embodiment, the encoding circuits 27, 57 correspond to encoding circuits. The decoding circuit 29 corresponds to a decoding circuit. The transmitting side selector 28 corresponds to a transmission switching circuit. The receiving side selector 30 corresponds to a reception switching circuit. The timing generating sections 21, 51 correspond to a timing generating circuit. The count clock CCK corresponds to a clock signal. The oscillating circuit, which generates the count clock CCK in the timing generating sections 21, 51, corresponds to a clock generating section. The transmit data TX and the receive data RX correspond to communication data.

<Other Embodiments>

It will be appreciated that the present invention is not limited to the configurations described above, but any and all modifications, variations or equivalents, which may occur to those who are skilled in the art, should be considered to fall within the scope of the present invention.

In the present embodiment, the master 3a is configured so as to be combined with a clock master. However, any of the slaves 3b may be configured so as to be a clock master. In this case, the slave serving as a clock master may be configured as with the master 3a.

In the present embodiment, the period of time of low level in the PWN code is set so as to be the period of time of ⅓ or ⅔ of one bit. However, the period of time of low level in the PWN code may be set so as to be the period of time of ¼ or ¾ of one bit.

In the present embodiment, ID set in the header of a frame specifies the data which is allowed to be transmitted. However, the node which is allowed to perform transmission may be specified.

In the present embodiment, the bit arbitration circuit 31 is configured so as to compare transmit data TX with receive data RX. However, the bit arbitration circuit 31 may be configured so as to compare transmit data TXD with receive data RXD.

Hereinafter, aspects of the above-described embodiments will be summarized.

The transceiver includes an input terminal which receives transmit data represented by a NRZ code, an output terminal which outputs receive data represented by a NRZ code, a communication terminal which receives and outputs communication data transmitted via a communication line, a mode setting terminal which receives a mode setting signal specifying a normal mode or a sleep mode, the normal mode being an operation mode in which a NRZ code is encoded into a predetermined transmission line code and the transmission line code is decoded into a NRZ code, and the sleep mode being an operation mode in which a function for encoding and decoding is stopped to establish a low power consumption state.

A transmission switching circuit provides, if the operation mode specified by the mode setting signal is a normal mode, the transmit data received from the input terminal to the encoding circuit to output the transmit data, which is encoded by the encoding circuit from a NRZ code into the transmission line code, as the communication data from the communication terminal, and outputs, if the operation mode specified by the mode setting signal is a sleep mode, the transmit data received from the input terminal as the communication data from the communication terminal In addition, a reception switching circuit provides, if the operation mode specified by the mode setting signal is a normal mode, the communication data received from the communication terminal to the decoding circuit to output the communication data, which is decoded by the decoding circuit from the transmission Line code into a NRZ code, as the receive data from the output terminal, and outputs, if the operation mode specified by the mode setting signal is a sleep mode, the communication data received from the communication terminal as the receive data from the output terminal.

According to the transceiver configured as described above, in the normal mode, the communication data encoded into the transmission line code can be transmitted and received via the transmission line. In the sleep mode, the data represented by a NRZ code can be transmitted and received via the transmission line.

That is according to the transceiver, in the sleep mode, a start signal represented by a NRZ code can be transmitted and received without operating the encoding circuit and the decoding circuit. Hence, power consumption in the sleep mode can be reduced.

The transceiver may include a timing generating circuit which has a clock generating section generating a clock signal and generates timing signals for controlling operations of the encoding circuit and the decoding circuit on the basis of the clock signal generated by the clock generating section.

In this case, if the operation mode specified by the mode setting signal is a sleep mode, the timing generating circuit stops operation of the dock generating section to stop the operation of the encoding circuit and the decoding circuit Hence, in the sleep mode, since the generation of the clock signal and the various timing signals is also stopped, the power consumption can be further reduced.

What is claimed is:

1. A transceiver, comprising:
    an input terminal which receives transmit data represented by a NRZ code;
    an output terminal which outputs receive data represented by a NRZ code;
    a communication terminal which receives and outputs communication data transmitted via a communication line;
    a mode setting terminal which receives a mode setting signal specifying a normal mode or a sleep mode, the normal mode being an operation mode in which a NRZ code is encoded into a predetermined transmission line code and the transmission line code is decoded into a NRZ code, and the sleep mode being an operation mode in which a function for encoding and decoding is stopped to establish a low power consumption state;
    an encoding circuit which encodes a NRZ code into the transmission line code;
    a decoding circuit which decodes the transmission line code into a NRZ code;
    a transmission switching circuit which, if the operation mode specified by the mode setting signal is a normal mode, provides the transmit data received from the input terminal to the encoding circuit to output the transmit data encoded by the encoding circuit as the communication data from the communication terminal, and which, if the operation mode specified by the mode setting signal is a sleep mode, outputs the transmit data received from the input terminal as the communication data from the communication terminal; and a reception switching circuit which, if the operation mode specified by the mode setting signal is a normal mode, provides the communication data received from the communication terminal to the decoding circuit to output the communication data decoded by the decoding circuit as the receive data from the output terminal, and which, if the operation mode specified by the mode setting signal is a sleep mode, outputs the communication data received from the communication terminal as the receive data from the output terminal.

2. The transceiver according to claim 1, further comprising a timing generating circuit which has a clock generating section generating a clock signal and generates timing signals for controlling operations of the encoding circuit and the decoding circuit on the basis of the clock signal generated by the clock generating section, wherein the timing generating circuit stops, if the operation mode specified by the mode setting signal is a sleep mode, operation of the clock generating section to stop the operation of the encoding circuit and the decoding circuit.

\* \* \* \* \*